United States Patent [19]

Vukovich

[11] 4,283,970

[45] Aug. 18, 1981

[54] AUTOMATIC TRANSMISSION LINE PRESSURE CONTROL

[75] Inventor: William J. Vukovich, Ypsilanti, Mich.

[73] Assignee: General Motors Corporation, Detroit, Mich.

[21] Appl. No.: 53,781

[22] Filed: Jul. 2, 1979

[51] Int. Cl.³ .................. B60K 41/06; B60K 41/10
[52] U.S. Cl. ........................ 74/866; 74/861; 74/862
[58] Field of Search ............ 74/866, 752 D, 861, 74/862

[56] References Cited

U.S. PATENT DOCUMENTS

| 3,321,056 | 5/1967 | Winchell et al. ......... 74/869 X |
|---|---|---|
| 3,448,640 | 6/1969 | Nelson ..................... 74/866 |
| 3,657,934 | 4/1972 | Ito et al. ................... 74/861 |
| 3,673,400 | 6/1972 | Ito ........................... 74/752 D |
| 3,713,355 | 1/1973 | Wakamatsu et al. ...... 74/752 D |
| 3,741,043 | 6/1973 | Oya et al. ................. 74/752 D |
| 3,927,528 | 12/1975 | Van Der Kolk et al. .... 74/861 |
| 3,956,947 | 5/1976 | Leising et al. ............ 74/866 |
| 4,009,699 | 3/1977 | Hetzler et al. ............ 123/146.5 A |
| 4,044,634 | 8/1977 | Florus et al. ............. 74/866 |
| 4,072,220 | 2/1978 | Hamada .................. 192/0.075 |
| 4,116,321 | 9/1978 | Miller ...................... 192/103 F |
| 4,198,882 | 4/1980 | Kiencke et al. .......... 74/866 |

FOREIGN PATENT DOCUMENTS

| 2748227 | 6/1978 | Fed. Rep. of Germany ..... 74/863 |
|---|---|---|
| 2315641 | 7/1974 | France ............................. 74/866 |

Primary Examiner—Leslie Braun
Attorney, Agent, or Firm—C. R. Meland

[57] ABSTRACT

A line pressure regulator for a vehicular, automatic shift, multi-gear ratio transmission. An electrical signal indicative of the desired pressure is developed as a function of engine throttle and vehicle speed. The signal is continually modified by a stored correction amount, and a line pressure is generated in accordance with the modified signal so that actual and desired values of an output result from which the correction amount is calculated substantially correspond.

9 Claims, 8 Drawing Figures

AUTOMATIC TRANSMISSION LINE PRESSURE CONTROL

This invention relates to fluid pressure regulators of the type used to regulate the line pressure in an automatic transmission. More particularly, this invention relates to an electronic control system for controlling the transmission line pressure in such a way that inaccuracy due to tolerance variations in the control elements as well as variations in general vehicle performance are continuously compensated for.

The line pressure in an automatic transmission is maintained by an oil pump and pressure regulator valve and is directed through selectively operated shift valves to fluid operated servos which control the engagement of various friction clutch elements for shifting transmission gear ratios. If the line pressure is too high, the clutch elements engage too rapidly and an abrupt and uncomfortable shift results. On the other hand, if the line pressure is too low, a long, drawn out shift results, subjecting the clutch elements to excessive wear and heat. Accordingly, many prior art transmissions of this type include hydraulic means for varying the line pressure, usually as a function of vehicle throttle position. It has also been proposed to control the transmission line pressure with electrical means via a solenoid-operated pressure regulator valve. In such a system, the line pressure is varied in accordance with certain engine and transmission operating parameters in a manner determined by an electronic control unit. Electronic controls are generally desirable because they offer increased flexibility, greater accuracy and precision, and substantial weight and cost savings. Such prior art designs, however, have necessarily resorted to the use of expensive precision solenoids or conventional closed loop control in order to take advantage of the accuracy available from electronic controls. Moreover, the prior art designs have expended little effort toward providing control that is adaptive to various conditions under which the vehicle operates.

It is accordingly an object of this invention to provide an electronic control system for controlling the line pressure of an automatic transmission with which a low cost, non-precision solenoid interface may be used.

It is another object of this invention to provide an electronic control system for controlling the line pressure of an automatic transmission in accordance with variable vehicle operating parameters wherein tolerance variations in the electrical-to-hydraulic interface that would adversely affect the accuracy of the control are compensated for.

It is yet another object of this invention to provide an adaptive electronic control system for controlling the line pressure of an automatic transmission in accordance with variable vehicle operating parameters wherein vehicle and transmission performance variations in general are compensated for.

In carrying these objects forward, this invention provides means for generating an electrical signal indicative of the desired transmission line pressure as a function of certain vehicular operating parameters; for developing a correction amount as a function of the difference between actual and desired values of an output result; for modifying the electrical signal by the correction amount over the entire range of operation; and for generating a transmission line pressure in accordance with the modified electrical signal.

In the first embodiment of this invention, the electrical signal indicative of the desired transmission line pressure is modified as a function of the difference between the actual time period taken to shift from a first gear ratio to a second gear ratio and a desired time period for executing the shift.

In the second embodiment of this invention, the electrical signal indicative of the desired transmission line pressure is modified as a function of the difference between the actual transmission line pressure and the desired transmission line pressure.

The second embodiment compensates for interface tolerance variations, and the first embodiment additionally compensates for other sources of error such as gradual degradation of vehicular and control system components, changes in the coefficient of friction between the transmission clutch surfaces, and engine performance variations due to altitude, tuning, aging and wear in general.

Both embodiments of this invention may be implemented with discrete electronic components although they are preferably to be implemented with a programmed general-purpose digital microprocessor.

Figure 1:
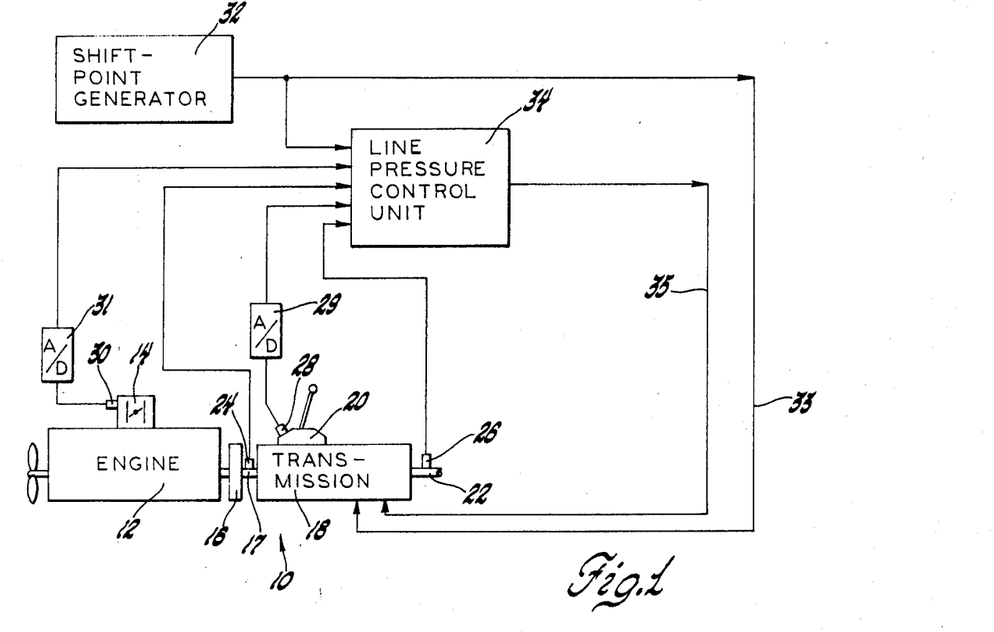
FIG. 1 is an overall schematic representation of a control system made in accordance with the first embodiment of this invention.

Referring now to FIG. 1, reference numeral 10 generally designates a vehicular power plant and drive train comprising engine 12, throttle 14, fluidic torque converter 16, turbine shaft 17, multi-gear ratio automatic transmission 18, gear or range selector 20, and drive shaft 22. Input speed transducer 24 is located between torque converter 16 and automatic transmission 18 and provides digital information relating to the rotational speed of turbine shaft 17. Speed transducer 26 similarly provides digital information relating to the rotational speed of output shaft 22. It should be apparent that the output of transducer 26 may be used as an indication of the speed of the vehicle. Transducers 24 and 26 may be of the magnetic pickup type as shown and described in the U.S. patent to Hetzler et al U.S. Pat. No. 4,009,699 that provide electrical pulses at a rate proportional to the rotational speed of a toothed wheel fixed to a rotating shaft. Selector position transducer 28 provides information relating to the position of gear selector 20 and throttle position transducer 30 provides information relating to the position of engine throttle 14. Transducers 28 and 30 may be implemented analogically by techniques well known to those skilled in the art of engine and transmission controls, and analog-to-digital converters (A/D) 29 and 31 operate in a well known manner to convert these signals to a digital format. The outputs of transducers 24 and 26, A/D converters 29 and 31, and shift-point generator 32 are applied as inputs to line pressure control unit 34, which will be later described in reference to FIGS. 4–8. The output of shift point generator 32 and line pressure control unit 34 are applied as inputs to the appropriate solenoid-controlled valves in transmission 18 by lines 33 and 35 respectively. The nature of shift-point generator 32 is immaterial to this invention so long as an electrical shift command may be obtained therefrom. There are numerous prior art shift point generators that fulfill this requirement, one such device being disclosed in the U.S. Pat. No. 3,448,640 to Nelson.

Figure 2:
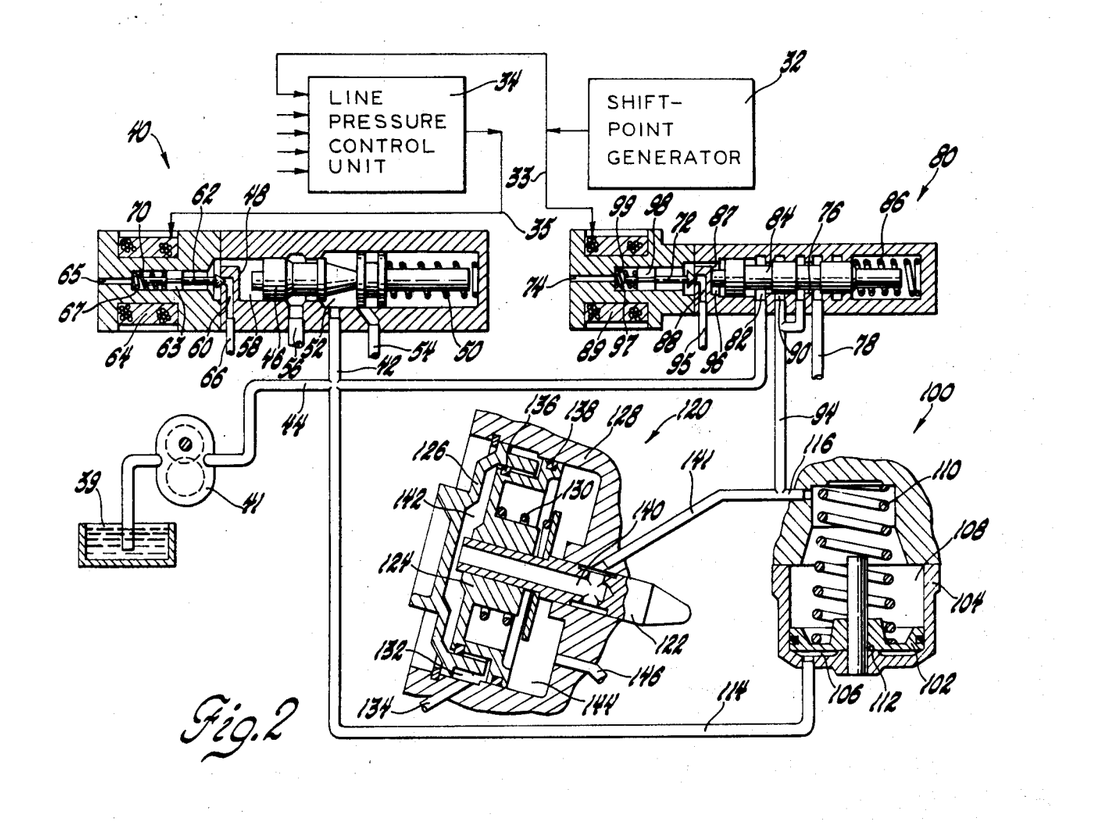
FIG. 2 is a representation of various hydraulic transmission elements including a solenoid-operated pressure regulator valve.

Referring now to FIG. 2, reference numeral 40 generally designates a solenoid-controlled pressure regulator valve that receives input oil from a fixed displacement pump 41 via line 44 and is pulse-width-modulated to control the average pressure in pressure line 42. Pressure regulator 40 is preferably a hydraulic valve of the type disclosed in the U.S. patent to Winchell et al U.S. Pat. No. 3,321,056, modified to receive a pulse-width-modulated bias pressure on the unsprung side of the valve element. Spring 50 is disposed between the valve body and one side of valve element 46 to urge valve element 46 to the left against valve body stop 48. As pump 41 applies oil pressure to chamber 52, the force provided by spring 50 is overcome and valve element 46 moves to the right as shown in FIG. 2 to supply oil through orifice 54 to fluidic torque converter 16. As the oil pressure applied to chamber 52 continues to increase, valve element 46 moves further in the same direction, exposing exhaust port 56, which may be connected to the intake reservoir of oil pump 41, designated by reference numeral 39. By exhausting oil from chamber 52 through port 56, the pressure in chamber 52 decreases and valve element 46, urged by spring 50, returns toward its original position, closing exhaust port 56. In this way, a regulated pressure appears in line 42, the magnitude of the pressure being a function of the spring constant of spring 50. The valve land diameter defining the right-hand side of chamber 52 is slightly larger than the valve land diameter defining the left-hand side of chamber 52 as shown in FIG. 2 in order for the pressure in line 42 to produce the valve movement described above.

The position of valve element 46 is further influenced by the pressure applied to chamber 58. A constant reference pressure, which may be obtained from a standard transmission pressure regulator valve is applied via line 66 to passage 60. Needle valve stem 62 and coil 64 form a solenoid, whereby selective energization of coil 64 controls the restriction in passage 60. Slotted nut 63 is fixed to needle valve 62 and spring 70 is disposed between slotted nut 63 and valve body rim 67 to urge needle valve 62 to an unactuated, closed position as shown in FIG. 2, completely restricting passage 60. In this position, any fluid in chamber 58 is exhausted through slotted nut 63 to exhaust passage 65. When solenoid coil 64 is actuated, needle valve 62 moves against the force of spring 70 to an open position, leaving passage 60 unrestricted and blocking exhaust passage 65. A pressure in chamber 58 aids the pump pressure in chamber 52 in moving valve element 46 to the right against the force of spring 50. The existence of oil pressure in chamber 58 thus allows more oil to escape through exhaust port 56 than would otherwise be possible, tending to decrease the output pressure in pressure line 42. Thus, the regulated output pressure in pressure line 42 may be varied by controlling the amount of pressure in chamber 58. If passage 60 is restricted (solenoid not actuated) the output pressure in pressure line 42 is at a maximum; if passage 60 is unrestricted (solenoid actuated) the output pressure in pressure line 42 is at a minimum. It will be appreciated that this feature contributes to a favorable electrical failure mode since the transmission will function adequately with maximum line pressure.

Solenoid coil 64 is preferably actuated via line 35 with a pulse-width-modulated signal obtained at the output of line pressure control unit 34. The actuation signal may be described in terms of the duty-cycle, or the time portion for which coil 64 is actuated. For example, 100% duty-cycle corresponds to continuous actuation and 0% duty-cycle corresponds to continuous deactuation. The average pressure in chamber 58 is thus directly proportional to the duty-cycle and the output pressure in line 42 is inversely proportional to the duty-cycle.

In addition to pressure regulator valve 40 and pump 41, FIG. 2 also shows several hydraulic elements typically used in automatic transmissions including shift valve 80, accumulator 100, and band-apply servo 120. It should be appreciated that the elements shown comprise only a portion of the transmission and that line pressure may be directed to other hydraulic elements as well. The elements shown operate to shift the transmission from first gear to second gear (1–2) and are so illustrated in order to more clearly describe and explain the operation of the invention.

Reference numeral 80 generally designates a solenoid-operated shift valve which, when actuated by shift-point generator 32 through line 33, is operative to direct line pressure to accumulator valve 100 and servo 120. Regulated line pressure is applied to port 82 and spring 86 urges valve element 84 to the left against stop 87, isolating input port 82 from output port 90. A reference pressure, which may be the same as that in pressure line 66, is applied to passage 88 via line 95 and actuation of solenoid coil 89 controls the position of needle valve stem 72 to control the application of reference pressure to chamber 96. Slotted nut 98 is fixed to needle valve 72 and spring 97 is disposed between valve body rim 99 and nut 98 to urge needle valve 72 to a closed, unactuated position as shown in FIG. 2. In this position, passage 88 is completely restricted and any pressure in chamber 96 is exhausted through slotted nut 98 to exhaust passage 74. When solenoid coil 89 is actuated, needle valve 72 moves against the force of spring 97 to an open position, leaving passage 88 unrestricted and blocking exhaust passage 74. In this position reference pressure is applied to chamber 96, moving valve element 84 against the force of spring 86 to an open position, connecting input port 82 to output port 90. When solenoid coil 89 is deactuated, needle valve 72 returns to the closed position, and the force of spring 86 moves valve element 84 to its original position, separating input port 82 and output port 90. As was similarly noted in reference to shift-point generator 32, it is immaterial to this invention that shift valve 80 be solenoid-operated. It need only be compatible with the output of shift-point generator 32.

Reference numeral 100 generally designates a 1-2 accumulator in which a piston 102 is slidably disposed in a housing 104 to establish accumulator chamber 106 and control chamber 108. Spring 110 is disposed between the piston and the other end of control chamber 108 to urge piston 102 against stop 112. Before shift valve solenoid 89 is actuated, accumulator chamber 106 is filled with line pressure oil via pressure line 114 to move piston 102 upward against the force of spring 110. Any oil in chamber 108 is thereby displaced through pressure lines 116 and 94, shift valve orifice 76, and exhaust line 78. Exhaust line 78 may be connected to input reservoir 39 of oil pump 41 if desired. When shift valve solenoid 89 is actuated, line pressure enters chamber 108 via pressure lines 94 and 116 and aids the downward force provided by spring 110 to move piston 102 back to its original position. The importance of the above described operation of "stroking" accumulator 100 will be discussed in reference to the shifting sequence.

Reference numeral 120 generally designates an intermediate servo having a rod 122 that operates a band-type brake as used in many prior art planetary transmissions, as described in the U.S. patent to Winchell et al U.S. Pat. No. 3,321,056. Piston 124 is slidably disposed on seals 136 and 138 in cap member 126 and transmission housing 128 respectively. Rod 122 is connected to piston 124 as to be movably displaced therewith. Spring 130 urges piston 124 to the released position as shown in FIG. 2. Piston 124, having a dual-diameter, forms a differential area chamber 132 which is exhausted via port 134. Chamber 144 may be exhausted via exhaust line 146. Rod 122 has a central passage 140 through which second gear oil may be supplied to chamber 142 via pressure line 141. When the supplied pressure is sufficiently large, piston 124 and rod 122 move against the force of spring 130 to engage a band brake (not shown).

The shifting sequence with respect to the hydraulic elements illustrated will now be described. Prior to a shift command by shift-point generator 32, regulated line pressure from pressure regulator valve 40 is applied to input port 82 of shift valve 80 and to accumulator chamber 106, stroking accumulator piston 102 upward against the force of spring 110. A shift command from shift-point generator 32 actuates shift valve solenoid coil 89 to move valve element 84 in a direction to open the passage between input port 82 and output port 90. Line pressure is thereby applied to chamber 108 of accumulator 100 and to chamber 142 of servo 120. Servo chamber 142 is thereby filled, stroking servo piston 124 against spring 130 to apply the transmission brake band to begin engaging second gear. At the same time, the line pressure enters chamber 108 of accumulator 100 aiding spring 110 to stroke accumulator piston 102 downward. The oil thereby displaced from chamber 106 may be supplied as line pressure to other hydraulic elements. When spring 130 is completely compressed and spring 110 is completely extended, full line pressure is applied via rod 122 to the brake band and the shift sequence is completed. The second gear ratio is completely engaged, however, sometime before full line pressure is applied to the band. The stroking of accumulator piston 102 absorbs some of the line pressure oil supplied by shift valve 80 via line 94 so that the brake band is not suddenly applied with line pressure. The rate at which accumulator piston 102 is stroked and hence the rate at which the brake band is applied is a function of the spring constant of springs 130 and 110 and of the magnitude of the line pressure, which in turn is a function of the duty-cycle applied to pressure regulator solenoid coil 64 by line pressure control unit 34.

Figure 3:
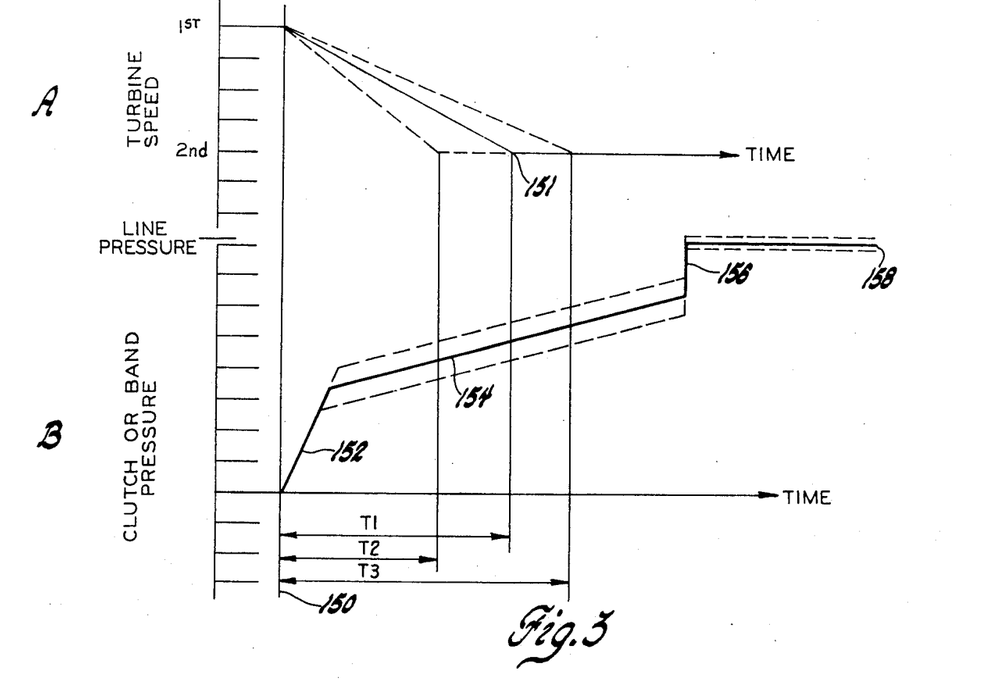
FIG. 3 is a graphical representation of clutch pressure and turbine speed vs. time, illustrating the effect of uncompensated variations in general.

The graphs of FIG. 3 illustrate the relationship between the transmission line pressure and the shift-time. Graph A shows turbine speed vs. time for a typical 1-2 shift and graph B shows the pressure applied to a clutch or band vs. time for the same shift. The solid traces correspond to a shift performed at the desired line pressure as developed by an electronic control unit, and the broken traces correspond to shifts performed with improper line pressures. Reference numeral 150 designates the instant of time at which a 1-2 shift command is received by shift valve 80. During the upshift, the turbine speed decreases as the clutch or band pressure increases, second gear being fully engaged when the turbine speed decreases to a lower level designated by reference numeral 151. The two slopes of increasing clutch or band pressure shown in graph B and designated by reference numerals 152 and 154 correspond to the spring constants of servo spring 130 and accumulator valve spring 110, respectively. When accumulator piston 102 is fully stroked, the clutch or band pressure sharply rises as designated by reference numeral 156, to the regulated line pressure as indicated at the top of graph B and by reference numeral 158.

Each of the three line pressures illustrated result in different shift-times as shown below graph B. Time T1 represents the proper shift-time corresponding to the desired line pressure, and times T2 and T3 represent shift-times corresponding to an improperly high and low line pressure respectively. That is, the output signal of an electronic control unit that corresponds to shift-time T1, may result in shift-times varying from T2 to T3 depending upon engine-transmission performance variations and the particular solenoid used in the pressure regulator valve. Thus, for the instant vehicle speed and engine throttle angle, time T2 represents a shift-time that is too short and abrupt, resulting in passenger discomfort and possible destruction of the clutch elements. On the other hand, T3 represents a shift-time that is too long and drawn out, resulting in excessive clutch slippage and possible clutch destruction from the excessive heat thereby generated.

Figure 4:
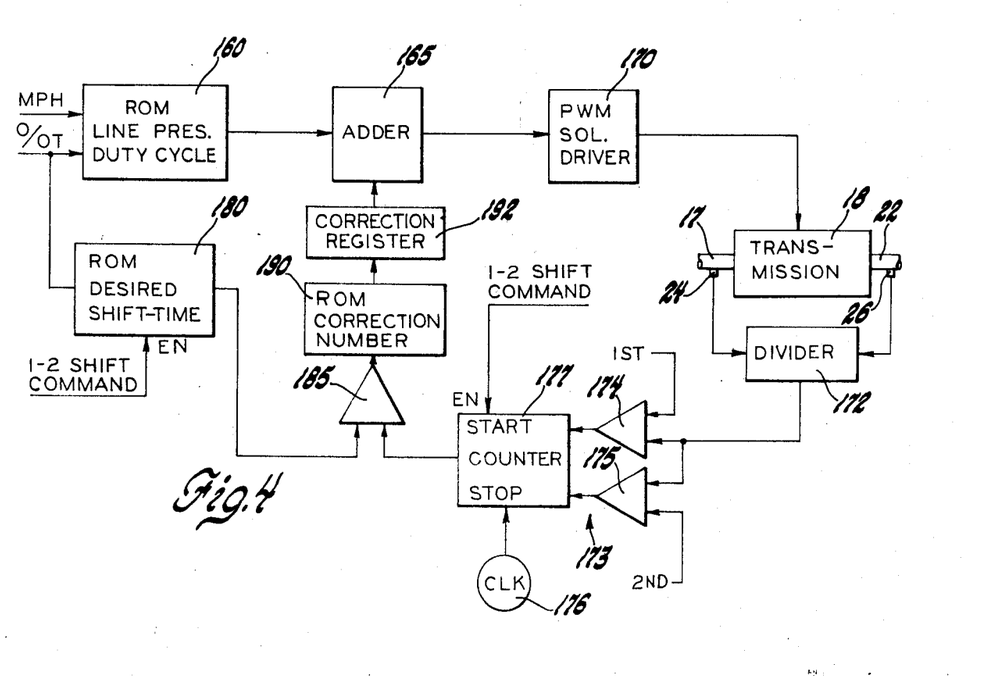
FIG. 4 is a schematic representation of a hardware implementation of the first embodiment of this invention.
Figure 5:
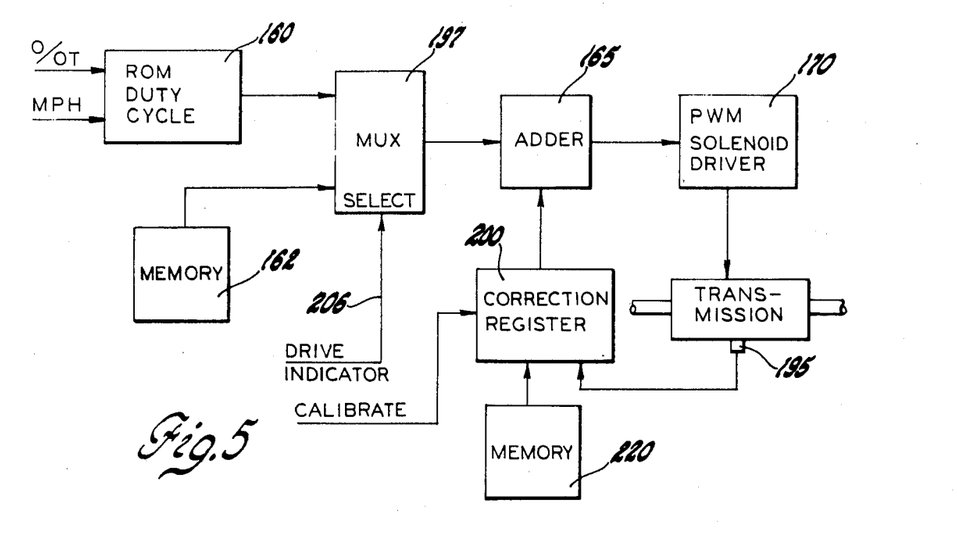
FIG. 5 is a schematic representation of a hardware implementation of the second embodiment of this invention.

This invention overcomes these problems by modifying the pressure signal that would otherwise be applied to solenoid coil 64 in order to compensate for solenoid-to-solenoid tolerance variations. The alternative solution which this invention avoids is the use of conventional closed loop control or precision solenoids having acceptably low tolerance variations. FIG. 4 schematically illustrates a first embodiment and FIG. 5 schematically illustrates a second embodiment.

Referring now to FIG. 4, a first embodiment of a digital control system is illustrated for controlling the line pressure in transmission 18. The control system incorporates a number of conventional semiconductor read-only memories, hereinafter referred to as ROM's. Each ROM may be viewed as a lookup table for retrieving a previously derived and stored value of a dependent variable as a function of one or more independent variables used to address the ROM. In the interest of simplifying the description of this invention, the addressing arrangement for retrieving previously stored data from the ROM's is not illustrated since this technique is well known to those skilled in the art of electronics. For example, ROM 160 provides a function map generally resembling that shown in FIG. 2 of the above reference U.S. Pat. No. 4,009,699, but where previously derived data corresponding to the desired transmission line pressure are stored as a function of vehicle speed (MPH) and engine output torque as represented by the engine throttle angle (%T). Instantaneous values of vehicle speed (obtained from speed transducer 26) and engine throttle angle (obtained from A/D converter 31) are used to address ROM 160, and a transmission line pressure corresponding to the address values appears at the output. More specifically, the output of ROM 160 represents a duty-cycle which when applied to pressure regulator solenoid coil 64 results in the proper line pressure in transmission 18.

The output of ROM 160 is applied through digital adder 165 to Pulse-Width-Modulation (PWM) solenoid driver 170. PWM driver 170 merely converts the digital duty-cycle number received from adder 165 into a series of current pulses that correspond to that duty-cycle, as is well known to those skilled in the art of electronic control. The current pulses generated by PWM driver 170 are applied to pressure regulator solenoid coil 64 of transmission 18, causing a corresponding regulated pressure to appear in pressure line 42 as described in reference to FIG. 2. The output of transducer 24, which provides a signal indicative of the rotational speed of turbine shaft 17 and transducer 26, which provides a signal indicative of the rotational speed of output shaft 22 are applied as inputs to divider 172. The output of divider 172 is a digital number representative of the ratio of the transmission input speed to the transmission output speed. Since the input-to-output transmission speed ratios for the first and second gears are known, the disengagement of first gear and the subsequent engagement of second gear may be detected by comparing the output of divider 172 with the known ratios. This function may be performed with comparator pair 173. The output of divider 172 is applied to a first input of both comparators 174 and 175. A reference number indicative of the first gear ratio is applied to the second input of comparator 174 and a reference number indicative of the second gear ratio is applied to the second input of comparator 175. The output of comparator 174 is energized when the first gear ratio is disengaged and the output of comparator 175 is energized when the second gear ratio is engaged. Counter 177 is responsive to the outputs of comparator pair 173, and is provided to measure the time period beginning with the disengagement of first gear (indicated by a signal at the START input) and ending with the engagement of second gear (indicated by a signal at the STOP input). The 1-2 shift command signal from shift-point generator 32 is applied to an enable input (EN) permitting counter 177 to count clock pulses from clock 176 in accordance with the outputs of comparator pair 173. When a 1-2 shift is completed, the output of counter 177 thereby represents the actual shift-time in shifting from first gear to second gear. Thus, the combination of divider pair 173, counter 177, and clock 176 constitute a timer for detecting the time duration between disengagement of first gear and engagement of second gear. Comparator 174 is needed to start counter 177 since there may be a hydraulic lag between the issuance of a 1-2 shift command and the disengagement of first gear. Also in response to the 1-2 shift command, ROM 180 outputs a signal indicative of a desired shift-time as a function of the instantaneous throttle angle (%T). ROM 180 operates in the same manner as ROM 160 except that the dependent variable (desired shift-time) is retrieved as a function of only one independent variable (throttle angle). As indicated in FIG. 4, the throttle angle signal (%T) for addressing ROM 180 may also be obtained from A/D converter 31. The shift-time data stored in ROM 180 may be derived empirically and generally corresponds to the shift-feel the driver expects, based on the throttle angle he or she sets with the accelerator pedal. The output of ROM 180 along with the output of counter 177 is applied to comparator 185. The output of comparator 185 thereby represents the difference between the actual shift-time as measured by counter 177 and the desired shift-time as read from ROM 180. That difference relates to a shift-time error resulting from solenoid tolerances or engine-transmission performance variations. The output of comparator 185 is used to address ROM 190, which yields a pressure correction number in the form of a solenoid duty-cycle as a function of shift-time error. That is, ROM 190 converts a shift-time error into a line pressure error in the form of a duty-cycle to be applied to pressure regulator solenoid coil 64. The correction number from ROM 190 is applied to correction register 192 so as to modify the number stored in correction register 192 by an amount equal to the correction number from ROM 190. The resulting number stored in correction register 192 is thus an accumulated correction amount. It is applied as an input along with the output of ROM 160, to adder 165, and the resultant sum is applied to PWM solenoid driver 170. The output of ROM 160 continually changes as the input parameters change, and the correction amount stored in correction register 192 is algebraically added to each output value of ROM 160. Initially, no number is stored in correction register 192. The first correction number read from ROM 190 is stored in correction register 192 and thereafter the correction amount in register 192 may be updated after each 1-2 shift by the output of ROM 190 which reflects the uncorrected or remaining error. It will be appreciated that the correction numbers stored in ROM 190 represent both positive and negative amounts by which the contents of correction register 192 may be modified. The data stored in each of the read-only memories may be obtained through field testing and is preferably chosen to result in a comfortable and responsive shift-feel and prompt correction of a shift-time error.

The digital control system of FIG. 4 has not included detailed information as to clocking and gating of various signals between the control blocks disclosed therein nor has it gone into any detail as to the addressing and subsequent retrieval of information from the read-only memories since these techniques are well known to those skilled in the art of electronics. It is to be understood, however, that the system is arranged such that the following steps are performed in regard to the operation of FIG. 4. As long as the engine is running, the control system repeatedly performs a sequence of steps comprising: reading the input parameters of vehicle speed (MPH) and engine throttle angle (%T) from transducer 26 and A/D converter 31 respectively and addressing ROM 160 with the input parameters; adding in adder 165 the outputs of ROM 160 and correction register 192; generating in PWM driver 170 a PWM signal corresponding to the output of adder 165; and applying the PWM signal to pressure regulator solenoid coil 64. Each time shift point generator 32 issues a 1-2 shift command, the following sequence of steps is performed. First, ROM 180 is enabled (EN) to retrieve the appropriate desired shift-time, and counter 177 is enabled (EN) to count clock pulses from clock 176 in accordance with the outputs of comparator pair 173. When the 1-2 shift is completed (as may be sensed by the output of comparator 175), the outputs of counter 177 and ROM 180 are compared by comparator 185 and their difference is applied to the address input of ROM 190. Finally, the output of ROM 190 (duty-cycle correction number) modifies the contents of correction register 192.

It should be noted that under ideal conditions the line pressure duty-cycle retrieved from ROM 160, when applied to pressure regulator solenoid coil 64, results in a shift-time corresponding to the output of ROM 180. However, solenoid tolerance variations in pressure regulator valve 40, as well as engine-transmission performance variations may result in a shift-time error as shown in graph B of FIG. 3. The primary reason for the shift-time error resides in the performance characteristics of the pressure regulator solenoid. This type of error relates to the inability of the control system to accurately convert the output of ROM 160 into the corresponding transmission line pressure, and this error is constant over the entire range of vehicle operation. Any residual shift-time error is due to engine-transmission performance variations, and this type of error relates to inaccuracy in the output of ROM 160. An example of such a performance variation is when the engine operates in an out-of-time condition, as will be more thoroughly discussed later. It will be appreciated that this type of error may change as the vehicle is driven. The first embodiment of this invention corrects for errors of both types whenever shift point generator 32 issues a 1-2 shift command. During the 1-2 shift, the shift-time error is converted to a line pressure duty-cycle which when added to or subtracted from the output of ROM 160 and applied to solenoid driver 170 will produce the proper transmission line pressure. For the entire range of vehicular operation, the line pressure thereby produced results in a proper shift-time and shift-feel based on the instant throttle angle (%T). The first embodiment thus compensates the output of ROM 160 for anything that might adversely effect the shift-time of the transmission. Other factors that may contribute to shift-time error include: changing coefficient of friction between transmission clutch surfaces, gradual degradation of vehicular and control components, and engine performance variations due to altitude, aging, and wear in general. Since the correction amount is updated each time the transmission performs a 1-2 shift, the sources of error are periodically compensated for. In this sense, the first embodiment may appropriately be referred to as an adaptive correction system. It should be appreciated that the compensation could just as easily be performed at any other shift-point (such as 2-3) if so desired. The 1-2 shift, however, is a convenient calibration point as it occurs periodically but not excessively.

FIG. 5 illustrates a digital control system for implementing a second embodiment of this invention. Several of the block elements described in reference to FIG. 4 are also shown in FIG. 5 and accordingly will not be discussed in detail. Such elements include ROM 160, adder 165, and PWM solenoid driver 170. In this embodiment, the line pressure duty-cycle from ROM 160 is applied to a first input of adder 165 whenever transmission gear selector 20 is in the drive or automatic-shift position. In all other positions, a fixed duty-cycle stored in memory 162 indicative of a reference line pressure is applied to the same input. That is, the desired line pressure signal comes from ROM 160 when gear selector 20 is in the drive position, and from memory 162 when gear selector 20 is in any other position. A digital pressure switch 195 set to the same reference pressure and in communication with the transmission line pressure provides information relating to the difference between the two. For example, pressure switch 195 may be connected to sense line pressure in pressure line 42. In response to a calibrate condition issued soon after the engine has been started, a correction amount is developed as a function of the difference and is applied to the second input of adder 165.

As with most prior art automatic transmission drive trains, engine 12 may not be started when gear selector 20 is in the drive position. Specifically, the engine may only be started when gear selector 20 is in park or neutral positions. Since the calibrate condition is given soon after the engine is started, the issuance of the calibrate condition must coincide with the application of the fixed duty-cycle (stored in memory 162) to the first input of adder 165. Moreover, the speed of the control system allows the correction signal to be developed before the driver can change the position of gear selector 20 to the drive position. Since the transmission cannot transmit torque when gear selector 20 is in park or neutral positions, the reference pressure may be any convenient value. The calibrate condition may be provided, for example, by an engine vacuum transducer (not shown) as will be well known to those skilled in the art.

A duty-cycle indicative of the reference pressure is stored in memory 162 and applied as an input along with the output of ROM 160 to multiplexer (MUX) 197. A signal from A/D converter 29 which indicates whether the transmission is in the drive position is applied to multiplexer 197 via conductor 206. This signal is applied to the SELECT input of multiplexer 197 so that a line pressure duty-cycle from ROM 160 is applied to adder 165 when gear selector 20 is in the drive position and the fixed duty-cycle stored in memory 162 is applied to adder 165 when gear selector 20 is in any other position, particularly park or neutral. Multiplexer 197 may thus be a standard, off-the-shelf device as will be recognized by those skilled in the art of electronics.

Pressure switch 195 operates as follows: if the line pressure exceeds the reference pressure, the output of switch 195 assumes a logical 1 voltage level and if the line pressure is less than the reference pressure, the output of switch 195 assumes a logical 0 voltage level. Switch 195 is preferably an off-the-shelf device such as the Part No. 1745-2183, Pressure Switch manufactured by FASCO, Shelby, North Carolina. The output of switch 195 is applied to correction register 200 for developing a correction amount to be applied to adder 165. When the calibrate condition is given, a fixed correction number stored in memory 220 is either added to or subtracted from the contents of correction register 200, depending upon the output of pressure switch 195. If the output of pressure switch 195 is a logical 1 (line pressure exceeds reference pressure), the contents of memory 220 are subtracted from the contents of correction register 200; if the output is a logical 0 (reference pressure exceeds line pressure), the contents of memory 220 are added to the contents of correction register 200.

The operation of correction register 200 may thus be performed with an Up/Down Counter, wherein the calibrate condition enables the counter to count up or down a number equal to the contents of memory 220, and the output of pressure switch 195 controls the counting direction. By modifying the contents of correction register 200 in accordance with the line pressure comparison provided by pressure switch 195, the duty-cycle applied to PWM solenoid driver 170 operates to adjust the actual line pressure toward the desired line pressure. Since pressure switch 195 only provides information relating to the relative magnitudes of the actual and desired line pressures, correction register 200 is continuously updated in the calibrated mode until the output of pressure switch 195 changes states. That is, when the output of pressure switch 195 changes states as a result of a correction amount update, the transmission line pressure substantially corresponds to the reference pressure and no further corrections are necessary. In this case suitable logic circuitry (not shown) responsive to a transition in the output of clears the calibrate condition preventing further correction. As in the first embodiment, the correction amount continually modifies the desired line pressure duty-cycle throughout the entire range of operation.

As in reference to FIG. 4, the digital control system illustrated in FIG. 5 has not included detailed information as to clocking and gating of various signals between the control blocks. This information involves techniques well known to those skilled in the art of electronics, and need not be presented here. It is to be understood, however, that the system is arranged such that the following steps are performed in regard to the operation of FIG. 5. As long as engine 12 is running, the control system repeatedly performs a sequence of steps comprising: reading the input parameters of vehicle speed (MPH) and engine throttle angle (%T) to address ROM 160; applying the output of ROM 160 and memory 162 to input terminals of multiplexer 197; applying the output of A/D converter 29 (indicative of the position of gear selector 20) to the SELECT input of multiplexer 197; adding in adder 165 the outputs of multiplexer 197 and correction register 200; and applying the output of adder 165 to PWM solenoid driver 170 for controlling the actuation of pressure regulator solenoid coil 64. When engine 12 is initially started correction register 200 is reset, and the above sequence of steps is performed at least once in order to establish the reference line pressure in transmission 18. The calibrate condition is then issued and the output of pressure switch 195 is read. The initial output value of pressure switch 195 is stored by an appropriate circuit (not shown) so that a change in state may be detected. The contents of memory 220 are then added to or subtracted from the contents of correction register 200. The above process of updating correction register 200 is repeated until the output of pressure switch 195 changes state. The sequence of steps for updating correction register 200 is then interrupted, and not reexecuted until engine 12 is restarted. The first described sequence of steps continues, however, as long as engine 12 is running.

It should be appreciated that the second embodiment of this invention compensates the transmission line pressure for error due to tolerance variations in the pressure regulator solenoid. The second embodiment assumes that the line pressure duty-cycle from ROM 160 is correct and it compensates for error from sources located between that point and the output of pressure regulator solenoid valve 40. Errors occurring in these sources do not change substantially as the vehicle is driven, and thus the correction amount need only be calculated once after the engine is started. Of course, the correction amount may be updated each time gear selector 20 is not in the drive position, if so desired. This may increase the accuracy of the control, but acceptable accuracy may be obtained with only one correction calculation per vehicle trip. The first embodiment, on the other hand, is better suited to periodic modification of the correction amount because it additionally compensates for errors that may change as the vehicle is driven.

Figure 6:
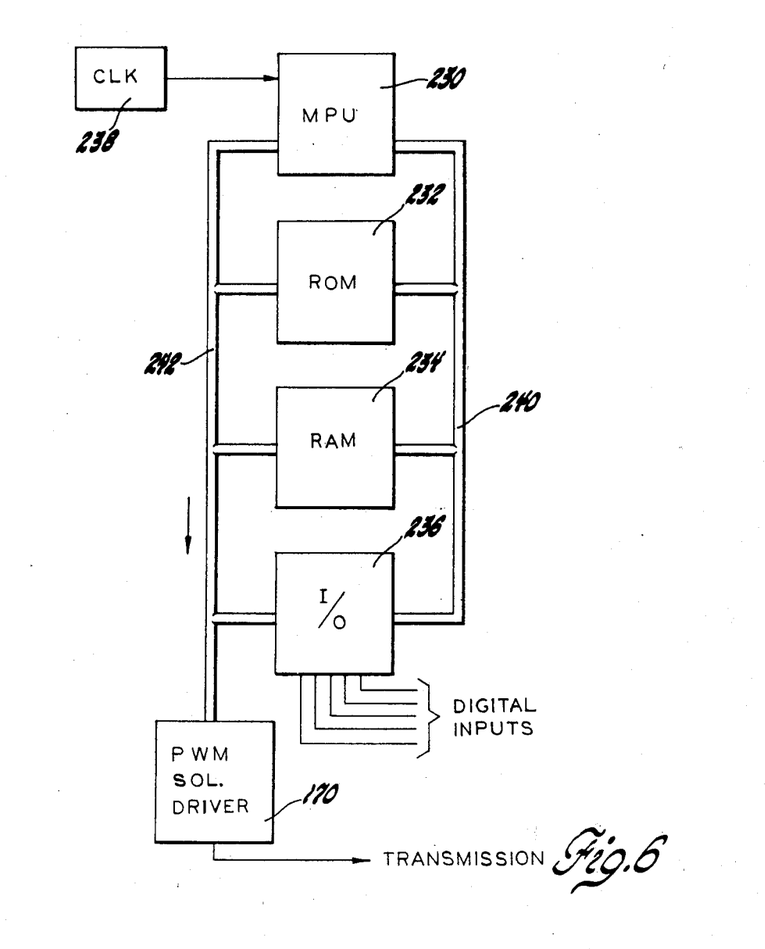
FIG. 6 is a block diagram of a general purpose microprocessor based controller for implementing this invention.

Although both embodiments of this invention may be implemented with discrete electronic components as disclosed in FIGS. 4 and 5, they are preferably implemented with a programmed general purpose microprocessor as generally shown in FIG. 6. Referring now more particularly to that Figure, reference numeral 230 designates a Microprocessor Unit (MPU) for directing the execution of the programmed instructions. Reference numeral 232 designates a Read-Only-Memory (ROM) to be used for the storage of program instructions and permanent data tables such as shown in FIGS. 4 and 5. Reference numeral 234 designates a Read-Write, or Random-Access-Memory (RAM) to be used for the storage of temporary or updated data such as the correction amount. Reference numeral 236 designates an interface circuit for controlling the acquisition of input data such as speed and throttle information, and the transfer of output data such as the digital number indicative of duty-cycle. The output duty-cycle is applied to PWM solenoid driver 170 for controlling the output pressure of pressure regulator valve 40 as illustrated in FIGS. 4 and 5. Clock 238 applies a series of electrical pulses to the clock input of MPU 230, the frequency of which determines the rate at which the microprocessor executes the programmed instructions stored in ROM 232. The MPU 230 communicates with the other elements of the system via a 16 bit Address bus 240 and an 8 bit Data bus 242.

The MPU 230 may be any well known type and may be for example a Motorola MC6800 microprocessor and the other elements may be any of a number of commercially available units compatible with the MC6800, such as the MCM6830 Read-Only-Memory (ROM), the MCM6810 Random-Access-Memory (RAM), and the MC6820 Peripheral Interface Adapter (I/O) for I/O control. Each of the above devices are manufactured by Motorola Semiconductor products, Inc., Phoenix, Arizona and are described in the MC6800 Microprocessor Application Manual available from that corporation. It should be appreciated that this invention is not limited to a MC6800 microprocessor, and that any of a number of commercially available units are equally capable of performing the above-described functions.

Figure 7:
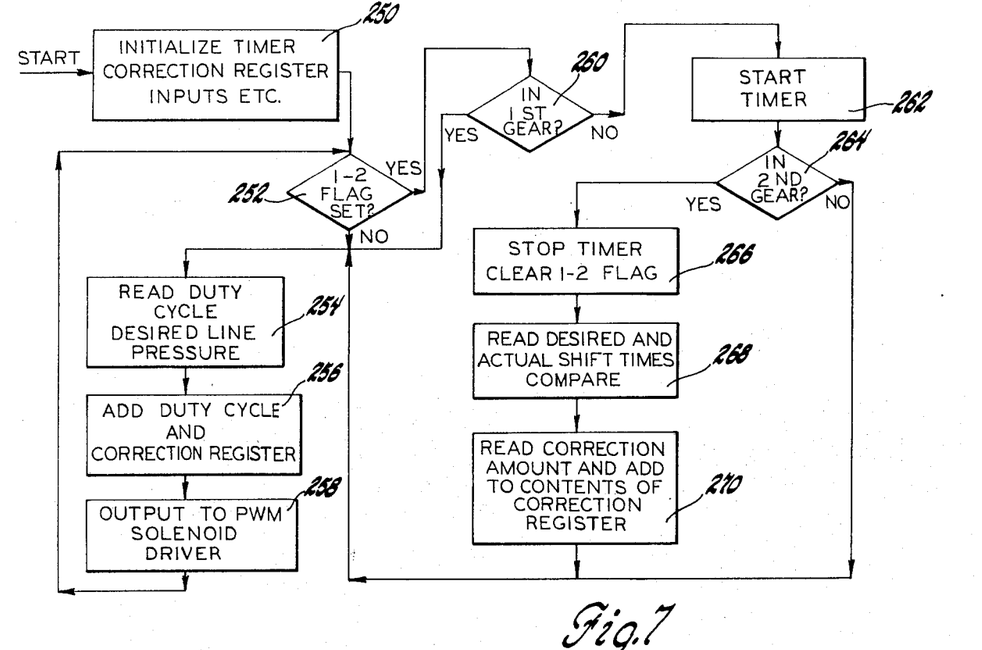
FIG. 7 is a flow diagram for implementing the first embodiment of this invention, with a general purpose microprocessor.

FIG. 7 is a flow diagram for implementing the first embodiment of this invention on a programmed microprocessor such as illustrated and described in reference to FIG. 6. The flow diagram represents a sequence of operations the programmed microprocessor is to perform, and translating a flow diagram into specific computer program instructions is a technique easily practiced by those skilled in the art of computer programming. When the engine is first started, the microprocessor performs a series of initialization functions as indicated in block 250. This procedure may include resetting the timer output, the correction register, and any inputs such as those indicative of the vehicular operating parameters. A decision is then made as to whether the calibrate condition is set. In this embodiment, the calibrate condition is the issuance of a 1-2 shift command from shift point generator 32 and this condition may be detected by setting a flag (logical 1) in a particular memory location in response to the shift command and periodically reading the contents of that memory location. Initially, the flag would not be set. Such a procedure is symbolized in the flow diagram by block 252. If the flag is not set, the duty-cycle is read from ROM 232 (block 254), the contents of the correction register is added to the duty-cycle (block 256), and the sum is transferred through I/O device 236 to PWM solenoid driver 170 (block 258). The flag is then reread and if it is not set, the above described sequence of operations (blocks 254, 256 and 258) is repeated. This sequence of operations is referred to as the major loop of the program because it is the normal mode of operation. If the flag is set and detected at block 252, the microprocessor operates in a calibrate mode in which the correction amount is updated if necessary. This procedure involves measuring the 1-2 shift-time, comparing the measured time to a desired time, and developing a correction amount as a function of that difference. First, a check is made to determine whether the transmission is still in first gear (block 260). Although the shift command has already been received, it is necessary to make the check since the loop-cycle time of the microprocessor is considerably faster than the hydraulic response time of the transmission. As explained before, engagement of any gear ratio can be detected by dividing the rotational speed of output shaft 22 by the rotational speed of turbine shaft 17 and comparing that ratio to known gear ratios. If the transmission is still in first gear, the microprocessor returns to the major loop instructions. If the transmission is not in first gear, the actual shift-time has commenced and a timer starts counting clock pulses (block 262). A check is then made to determine if second gear has yet engaged (block 264). If not, the timer is allowed to continue and the microprocessor returns to the major loop instructions. If second gear is engaged, the timer is stopped and the 1-2 shift flag is cleared or reset to logical 0 (block 266). The desired and actual shift times are then read and compared (block 268) and a correction number corresponding to the comparison is read from the proper look-up table in ROM 232 (block 270). The correction number then updates the contents of the correction register (block 270), which is added to each line pressure duty-cycle thereafter read. The microprocessor then returns to the major loop instructions until the next 1-2 shift command is issued, setting the 1-2 shift flag again. It should be appreciated that the hardware approach illustrated in FIG. 4 as well as the approach illustrated in FIGS. 6 and 7 are but alternate ways to implement the first embodiment of this invention and that the programmed microprocessor is the preferred means of implementation.

Figure 8:
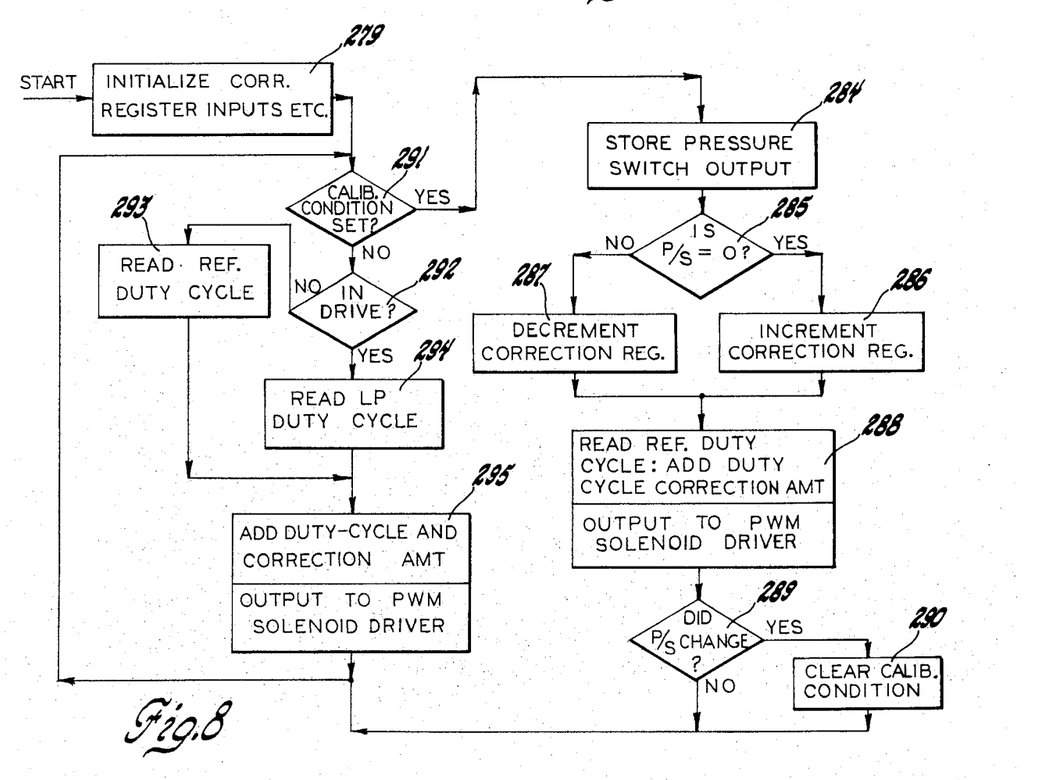
FIG. 8 is a flow diagram for implementing the second embodiment of this invention with a general purpose microprocessor.

FIG. 8 shows a flow diagram for implementing the second embodiment of this invention on a programmed microprocessor. When power is initially applied to the control system, the correction register and input data are initialized as indicated in block 279. The calibrate condition is then checked as in the first embodiment (block 291). In this embodiment, the calibrate condition is the starting of the engine, and this condition may be detected by setting a flag (logical 1) in a particular memory location soon after engine starting occurs and by periodically reading the contents of that memory location. The flag may actually be set in response to the output of a sensor such as an engine vacuum switch that indicates that the engine is running. The flat must not be set, however, until the major loop has been executed at least once so that the reference pressure is established in the transmission. As long as the flag is not set, the microprocessor repeatedly executes the major loop instructions, which includes blocks 291-295. The position of the transmission gear selector is checked (block 292), and if it is not in the drive position, a fixed duty-cycle indicative of the reference pressure is read from memory (block 293). If the gear selector is in the drive position, the line pressure duty-cycle is read from the appropriate look-up table in ROM 232 (block 294). The number stored in the correction register is added to the proper duty-cycle and the sum is transferred through I/O device 236 to PWM solenoid driver 170 (block 295). The calibrate condition is then rechecked, completing the major loop. When the condition flag is set and detected, the output of pressure switch 195 is read and stored in a particular memory location (block 284). The output of pressure switch 195 is stored at this point in the loop so that the system will know when the proper correction has been made as will later be described. The logical level of the pressure switch output is then determined (block 285) and the correction register is accordingly incremented or decremented by a fixed amount. If the pressure switch output is a logical 0, the reference pressure exceeds line pressure and the correction register is incremented (block 286); if the pressure switch output is a logical 1, line pressure exceeds the reference pressure and the correction register is decremented (block 287). After the correction register is appropriately updated, the reference pressure duty-cycle is read from memory, added to the contents of the correction register, and the sum is transferred to PWM solenoid driver 170 (block 288). A check is then made to determine if the pressure switch output changed (block 289) as a result of the correction. This condition may be determined by reading the output level of pressure switch 195 and comparing it to the previously stored number corresponding to block 284. If the pressure switch output is the same, further correction is necessary and the microprocessor is immediately returned to the condition check (block 291) after which a further correction will be made since the calibrate flag remains set. If the pressure switch changed as a result of the correction, the desired line pressure and the actual line pressure substantially correspond and no further correction need be made. If this be the case, the condition flag is cleared (block 290) and the microprocessor is returned to the major loop. It may be necessary to insert a delay period between blocks 288 and 289 to take the hydraulic response time into account.

The magnitude of the fixed number that increments or decrements the correction amount represents an acceptable deviation between the actual and the desired line pressure. Thus, the actual and desired line pressures are in substantial correspondence when the pressure switch changes as the result of a correction adjustment. It should be appreciated as in reference to FIG. 7 that the hardware approach illustrated in FIG. 5 and the approach illustrated in FIG. 8 are but two ways to implement the second embodiment of this invention and that a programmed microprocessor is the preferred means of implementation.

The line pressure control unit 34, whether implemented by a microprocessor or discrete electronic devices, possesses a tremendous speed advantage compared to the hydraulic transmission elements it controls. Thus in the preferred embodiment, the instructions for performing this invention may comprise only one of a number of instruction sets executed by the microprocessor. That is, the same microprocessor may also be controlling other functions, such as shift point generation and torque converter lock-up clutch control. In this regard the cost advantage of the invention may increase since the same input data (throttle position, for example) may be used in controlling several functions.

This invention thus allows the use of an inexpensive solenoid interface for electronic transmission line pressure regulators by compensating the electronic signal indicative of the desired line pressure for inaccuracies due to tolerance variations from solenoid-to-solenoid. The second embodiment performs the compensation as a function of the difference between the actual and desired line pressures; the first embodiment performs the compensation as a function of the difference between the actual and desired shift-times for a specified gear change. Although both embodiments accomplish the same initial objective, the difference in the means for accomplishing the objective results in a noteworthy consequence. The second embodiment arrives at a correction amount based on a reference line pressure stored in memory; and thereby compensates for sources of error located between that point and the resulting line pressure in pressure line 42. Sources of this error may include the pressure regulator solenoid, hydraulic valve components in the pressure regulator, and electronic devices in the PWM solenoid driver. On the other hand, the first embodiment arrives at a correction amount based on a desired shift-time which relates the instant throttle position to the proper shift-feel. The first embodiment thereby compensates the line pressure duty-cycle for error due to anything that would affect the shift-time considered to be proper for the throttle position set at the time of the shift. In addition to the sources of error listed above, the first embodiment also compensates for sources of error such as changes in the coefficient of friction of the clutch or band elements in the transmission, and engine performance variations due to altitude, tuning, aging and wear in general. For example, if the transmission clutch elements are overheated or otherwise affected in a manner to decrease the coefficient of friction between the elements, the actual 1-2 shift-time would be correspondingly longer than the desired shift-time, under the circumstances. This may be true even though the actual line pressure corresponds to the desired line pressure stored in ROM 160. In such a situation, the first embodiment of this invention would generate a correction amount as a function of the difference between the actual and desired 1-2 shift-times that would increase the duty-cycle applied to pressure regulator solenoid coil 64 so that the actual shift-time (and hence shift-feel) would substantially correspond to the desired shift-time, based on the throttle position set by the driver, despite the deficiency of the transmission clutch elements.

Unlike a closed loop control system wherein an output parameter is controlled by continual comparison of a desired signal with a feedback signal, the control systems of this invention operate closed loop only when predetermined calibration conditions exist. Both embodiments of this invention asynchronously develop a correction amount for continuously compensating the desired line pressure signal, enabling precise electronic control of transmission line pressure and shift-feel throughout the entire range of vehicle operation.

The embodiments of the invention in which an exclusive property or privilege is claimed are defined as follows:

1. A compensated line pressure regulator for a vehicular multi-gear ratio automatic shift transmission for controlling the line pressure applied to hydraulic elements of the transmission that are operative to shift the transmission between gear ratios comprising:
   means responsive to at least one vehicular operating parameter for developing a first electrical signal indicative of a desired line pressure;
   means including electrically energizable means for generating a variable line pressure the magnitude of which is a function of an electrical control signal applied thereto;
   means responsive to the shifting of said transmission between first and second gear ratios for generating a shift-time signal indicative of the time elapsed in shifting from said first gear ratio to said second gear ratio;
   means for generating a reference signal indicative of the desired shift-time for shifting from said first gear ratio to said second gear ratio;
   means responsive to said reference signal and to said shift-time signal for generating a correction signal the magnitude of which is a function of the difference between said reference signal and said shift-time signal;
   means for modifying said first electrical signal as a function of said correction signal to form a control signal; and
   means for applying said control signal to said electrically energizable means whereby said first electrical signal is compensated when said transmission is shifted from said first gear ratio to said second gear ratio to adjust the line pressure to bring the actual and desired shift-times into substantial correspondence.

2. A compensated line pressure regulator for vehicular multi-gear ratio automatic shift transmission for controlling the line pressure applied to the hydraulically operated clutch elements therein that are operative to shift the transmission between gear ratios, comprising:
   means responsive to at least one vehicular operating parameter for developing a first electrical signal indicative of a desired line pressure;
   means including electrically energizable means for generating a variable line pressure as a function of an electrical control signal applied thereto;
   means for storing a correction amount for compensating said first electrical signal;
   means for modifying said first electrical signal as a function of said correction amount to form a control signal;
   means for applying said control signal to said electrically energizable means for generating a transmission line pressure in accordance with said control signal;
   means responsive to the shifting of said transmission between first and second gear ratios for generating a shift-time signal indicative of the time elapsed in shifting from said first gear ratio to said second gear ratio;

means for generating a reference signal indicative of the desired shift-time for shifting from said first gear ratio to said second gear ratio;

means responsive to said reference signal and to said shift-time signal for generating a correction signal the magnitude of which is a function of the difference between said reference signal and said shift-time signal; and means for modifying said stored correction amount as a function of said correction signal whereby said stored correction amount is updated when said transmission is shifted from said first gear ratio to said second gear ratio to bring the actual and desired shift times into substantial correspondence throughout the entire range of vehicle operation.

3. A method for controlling the line pressure of a vehicular multi-gear ratio automatic shift transmission comprising the steps of:

developing a first electrical signal indicative of a desired line pressure as a function of at least one vehicular operating parameter;

modifying said first electrical signal as a function of a stored correction amount;

generating a variable line pressure as a function of said modified first electrical signal;

continually repeating the above steps while the vehicle is in operation, to generate a line pressure in said transmission in accordance with said vehicular operating parameter and said correction amount;

generating a shift-time signal indicative of the time elapsed for said transmission to shift from a first gear ratio to a second gear ratio;

generating a reference signal indicative of the desired shift-time for shifting from said first gear ratio to said second gear ratio; and updating said stored correction amount as a function of the difference between said reference signal and said shift-time signal whereby said correction amount is updated when said transmission is shifted from said first gear ratio to said second gear ratio to bring said actual and desired shift-times into substantial correspondence throughout the entire range of vehicle operation.

4. A compensated line pressure regulator for a vehicular multi-gear ratio automatic shift transmission for controlling the line pressure applied to hydraulic elements of the transmission that are operative to shift the transmission between gear ratios comprising:

means responsive to engine output torque for developing a first electrical signal indicative of a desired line pressure;

means including electrically energizable means for generating a variable line pressure the magnitude of which is a function of an electrical control signal applied thereto;

means responsive to the shifting of said transmission between first and second gear ratios for generating a shift-time signal indicative of the time elapsed in shifting from said first gear ratio to said second gear ratio;

means for generating a reference signal indicative of the desired shift-time for shifting from said first gear ratio to said second gear ratio;

means responsive to said reference signal and to said shift-time signal for generating a correction signal the magnitude of which is a function of the difference between said reference signal and said shift-time signal;

means for modifying said first electrical signal as a function of said correction signal to form a control signal; and means for applying said control signal to said electrically energizable means whereby said first electrical signal is compensated when said transmission is shifted from said first gear ratio to said second gear ratio to adjust the line pressure to bring the actual and desired shift-times into substantial correspondence.

5. A compensated line pressure regulator for a vehicular multi-gear ratio automatic shift transmission for controlling the line pressure applied to hydraulic elements of the transmission that are operative to shift the transmission between gear ratios comprising:

means responsive to engine output torque and vehicle speed for developing a first electrical signal indicative of a desired line pressure;

means including electrically energizable means for generating a variable line pressure the magnitude of which is a function of an electrical control signal applied thereto;

means responsive to the shifting of said transmission between first and second gear ratios for generating a shift-time signal indicative of the time elapsed in shifting from said first gear ratio to said second gear ratio;

means responsive to engine output torque for generating a reference signal indicative of the desired shift-time for shifting from said first gear ratio to said second gear ratio;

means responsive to said reference signal and to said shift-time signal for generating a correction signal the magnitude of which is a function of the difference between said reference signal and said shift-time signal;

means for modifying said first electrical signal as a function of said correction signal to form a control signal; and means for applying said control signal to said electrically energizable means whereby said first electrical signal is compensated when said transmission is shifted from said first gear ratio to said second gear ratio to adjust the line pressure to bring the actual and desired shift-times into substantial correspondence.

6. A compensated line pressure regulator for a multi-gear ratio automatic shift transmission having a manually-operated range selector comprising:

means responsive to the position of said range selector for producing a first electrical signal indicative of a desired line pressure as a function of at least one vehicular operating parameter when said range selector is in a first position, said first signal having a predetermined value when said range selector is in a second position;

means including electrically energizable means for producing a variable line pressure as a function of an electrical control signal applied thereto;

a pressure switch in communication with said transmission for comparing the transmission line pressure with said predetermined value;

means responsive to said pressure switch for generating a correction signal when said range selector is in said second position, said correction signal is in said second position, said correction signal being a function of said comparison;

means for modifying said first electrical signal as a function of said correction signal to provide a control signal; and means for applying said control signal to said electrically energizable means whereby said first electrical signal is compensated when said gear selector is in said second position to bring the actual and desired line pressures into substantial correspondence throughout the entire range of vehicle operation.

7. A compensated line pressure regulator for a vehicular multi-gear ratio automatic shift transmission having a manually operated range selector comprising:

means responsive to the position of said range selector for producing a first electrical signal indicative of a desired line pressure as a function of at least one vehicular operating parameter when said range selector is in a first position, said first signal having a predetermined value when said range selector is in a second position other than a drive position;

electrically energizable means for producing a variable line pressure as a function of an electrical control signal applied thereto;

means for storing a correction amount for said first electrical signal;

means for modifying said first electrical signal as a function of said stored correction amount to provide a control signal;

means for applying said control signal to said electrically energizable means whereby a line pressure is produced in said transmission in accordance with said control signal;

means for comparing the transmission line pressure with said predetermined value when said range selector is in said second position; and means responsive to said comparison for decreasing said correction amount when said transmission line pressure exceeds said predetermined value and for increasing said correction amount when said predetermined value exceeds said transmission line pressure, whereby said first electrical signal is compensated to bring the actual and desired line pressures into substantial correspondence throughout the entire range of vehicle operation.

8. For a vehicular drive train comprising an engine, a multi-gear ratio automatic transmission, and a manual range selector for said transmission, wherein said engine may only be started when said range selector is in a specified position other than a drive position, a method for regulating the line pressure in said transmission comprising the steps of:

producing in response to the position of said range selector a first electrical signal indicative of a desired line pressure as a function of at least one vehicular operating parameter when said range selector is in a first position, said first signal having a predetermined value when said range selector is in said specified position;

modifying said first electrical signal as a function of a stored correction amount;

generating a variable line pressure as a function of said modified electrical signal;

continually repeating the above steps while the vehicle is in operation to generate a line pressure in said transmission in accordance with said vehicular operating parameter and said stored correction amount;

comparing said transmission line pressure with said predetermined value when said engine is first started; and adjusting said stored correction amount as a function of said comparison whereby said correction amount is established when said engine is first started.

9. A method for controlling the line pressure of a vehicular multi-gear ratio automatic shift transmission comprising the steps of:

developing a first electrical signal indicative of a desired line pressure as a function of vehicle speed and engine output torque;

modifying said first electrical signal as a function of a stored correction amount;

generating a variable line pressure as a function of said modified first electrical signal;

continually repeating the above steps while the vehicle is in operation, to generate a line pressure in said transmission in accordance with said first electrical signal and said correction amount;

generating a shift-time signal indicative of the time elapsed for said transmission to shift from a first gear ratio to a second gear ratio;

generating a reference signal indicative of the desired shift-time for shifting from said first gear ratio to said second gear ratio as a function of engine output torque; and updating said stored correction amount as a function of the difference between said reference signal and said shift-time signal whereby said correction amount is updated when said transmission is shifted from said first gear ratio to said second gear ratio to bring said actual and desired shift-times into substantial correspondence throughout the entire range of vehicle operation.

* * * * *